United States Patent
Zikeli et al.

(10) Patent No.: US 7,029,622 B2
(45) Date of Patent: *Apr. 18, 2006

(54) METHOD FOR EXTRUDING A CONTINUOUS MOLDED BODY

(75) Inventors: Stefan Zikeli, Regau (AT); Friedrich Ecker, Timelkam (AT)

(73) Assignee: Zimmer A.G., Frankfurt am Main (DE)

( * ) Notice: Subject to any disclaimer, the term of this patent is extended or adjusted under 35 U.S.C. 154(b) by 309 days.

This patent is subject to a terminal disclaimer.

(21) Appl. No.: 10/296,072

(22) PCT Filed: Apr. 18, 2001

(86) PCT No.: PCT/EP01/04415

§ 371 (c)(1),
(2), (4) Date: Apr. 29, 2003

(87) PCT Pub. No.: WO01/90451

PCT Pub. Date: Nov. 29, 2001

(65) Prior Publication Data

US 2003/0168762 A1    Sep. 11, 2003

(30) Foreign Application Priority Data

May 22, 2000 (DE) ................................ 100 25 230

(51) Int. Cl.
*B29C 47/00* (2006.01)
*D01D 5/06* (2006.01)
*D01D 5/12* (2006.01)
*D01F 2/02* (2006.01)

(52) U.S. Cl. ...................... 264/555; 264/187; 264/203; 264/210.8; 264/211.14

(58) Field of Classification Search ................ 264/187, 264/203, 210.8, 211.14, 555
See application file for complete search history.

(56) References Cited

FOREIGN PATENT DOCUMENTS

| WO | 97/24476 A1 | 7/1997 |
| WO | 98/26122 A1 | 6/1998 |
| WO | 99/47733 A1 | 9/1999 |

*Primary Examiner*—Leo B. Tentoni
(74) *Attorney, Agent, or Firm*—McDonnell Boehnen Hulbert & Berghoff LLP

(57) ABSTRACT

The present invention relates to a method for producing a continuously molded body from an extrusion solution preferably containing water, cellulose and a tertiary amine. The extrusion solution is extruded through an extrusion duct orifice to obtain a continuously molded body. The continuously molded body is passed through an air gap in which it is stretched. To increase the loop strength and to reduce the tendency to fibrillate, the mean acceleration and/or the mean heat flow density are controlled according to the invention in accordance with predetermined formulae.

27 Claims, 1 Drawing Sheet

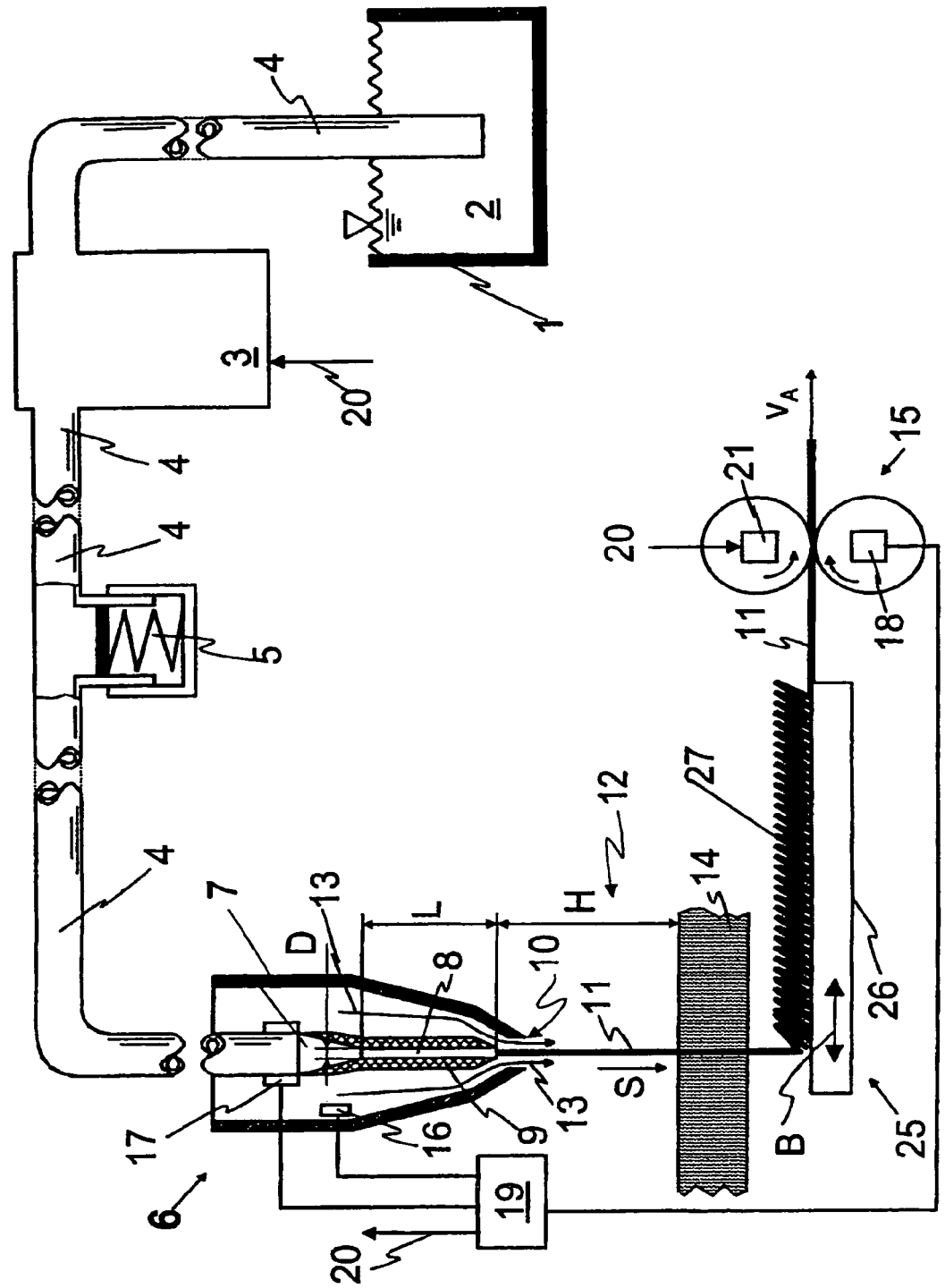

METHOD FOR EXTRUDING A CONTINUOUS MOLDED BODY

BACKGROUND OF THE INVENTION

The present invention relates to a method for extruding a continuously molded body from an extrusion solution, in particular an extrusion solution containing cellulose, water, tertiary amine oxide, as well as additions for stabilizing the spinning solution or additives in the form of organic or inorganic additions, the method comprising the following steps:

passing the extrusion solution through an extrusion duct of a predetermined length and a predetermined diameter to an extrusion duct orifice;

extruding the extrusion solution through the extrusion duct orifice to obtain an extruded, continuously molded body;

passing the continuously molded body through an air gap of a predetermined air gap height;

accelerating the continuously molded body in the air gap.

The continuously molded bodies produced by the above-mentioned method may have the shape of a yarn, filament or film. The above-identified method is specifically employed in the production of a continuously molded body in filament form as a spinning method for producing a spun filament.

The above-described method is e.g. known from U.S. Pat. No. 4,246,221. This document describes the production of cellulosic molded bodies using spinnerets as extrusion duct orifices. A method is here employed in which the spun filament is guided through air after having exited from the spinneret. The spun filament is stretched in air. The stretching operation is performed by applying a mechanical withdrawal force by means of a withdrawal mechanism arranged after the spinning device.

AT-395863B describes a further method for producing a cellulosic molded body. In this method the height of the air gap is set to be short. The diameter of the spinneret orifices are in this method between 70 and 150 micrometer, the duct length of the spinnerets is between 1000 and 1500 micrometer. With the shortened air gap and the special nozzle configuration titer variations and filament breaks as well as conglutination between neighboring filaments are to be reduced.

DETAILED DESCRIPTION OF THE INVENTION

The methods which are known from the prior art and employed for producing continuously molded bodies have the drawback that the characteristics of the continuously molded body, specifically their tendency to filbrillate and their loop strength, cannot be varied in a selective way.

It is therefore the object of the present invention to improve the known method used for extruding a continuously molded body from an extrusion solution in such a manner that the loop strength is improved and the tendency to fibrillate reduced.

According to the invention this object is achieved for the above-mentioned method in that the following additional step of the method is carried out:

controlling the thermal flow density Q averaged substantially over the air gap height to have a value $$Q = \frac{0.004}{\alpha \cdot \left[\frac{1}{\beta}\right]^{0.3}},$$

where $\beta$ is the ratio of length to diameter of the extrusion duct and the value of the control parameter $\alpha$ is at least 0.1.

A high basic level as to loop strength and tendency towards fibrillation can be achieved with this simple measure. The heat flow density Q represents a value of the heat flow in W/mm³ per volume unit of the air gap space, which value is substantially averaged over height H of air gap 12. The heat flow density is the quantity of heat charged by the spinning solution into an air gap space directly surrounding the continuously molded body. The air gap space is formed between the extrusion duct orifice and the upper edge of the spinning bath and by the spinning space formed by the filaments.

The values for the mechanical and textile physical characteristics of the continuously molded body can be improved if the value of the control parameter $\alpha$ is at least 0.2 in a further advantageous development.

The textile characteristics of the continuously molded body can be improved once again if the control parameter $\alpha$ in a further development of the method is at least 0.5.

The lowest tendency towards fibrillation and the greatest loop strength have been achieved in a development of the method in which the value of the control parameter $\alpha$ is at least 1.0.

To control the heat flow density in the air gap, the temperature of the continuously molded body or the temperature of the air surrounding the continuously molded body in the air gap can be varied. The air temperature may generally be the temperature of the ambient air or the temperature of the air flowing along the continuously molded body. The heat flow density in the air gap increases with a decreasing air temperature and an increased air velocity and a rising temperature of the continuously molded body. Attention has here to be paid that the degree of stretching is also varied by adjusting the air velocity. For simplifying the control one of said temperatures may also be kept constant.

In a further advantageous development of the method the heat flow density Q in the air gap can in particular be adjusted by taking the following measure:

controlling a temperature difference $\Delta T = T_E - T_L$ between temperature $T_E$ of the extrusion solution and temperature $T_L$ of the air to have a value:

$$\Delta T = \frac{H}{d} \cdot \frac{0.004}{\dot{m} \cdot c_E \cdot \alpha \cdot \left[\frac{1}{\beta}\right]^{0.3}},$$

where m is the mass flow of the extrusion solution through the extrusion duct orifice in g/s, $c_E$ the specific thermal capacity of the extrusion solution in J/gK, d the hole density of the bores provided in the die plate in hole/mm², and H is the length of the air gap in mm.

Moreover, all of the other factors listed in the equation can be used for controlling the spinning process.

Advantageously, the characteristic value $\beta$ which designates the ratio of the length of the extrusion duct to its diameter may be at least 2. Particularly good values for the loop strength and tendency towards fibrillation can be achieved whenever the value β is not more than 150. The mechanical characteristics can here be improved when the value of β is 100 at the most.

For the stabilization of the continuously molded body after extrusion and after acceleration, i.e. stretching, the continuously molded body may be wetted by a coagulation bath after having passed through the air gap. The continuously molded body can in particular be wetted by being sprayed by a wetting device or immersed into a coagulation bath.

The specific thermal capacity $c_E$ of the extrusion solution may advantageously be at least 2.1 J/(g/K) and 2.9 J/(G K) at the most.

In a further advantageous development the following additional step of the method can be carried out:

controlling acceleration $\bar{a}$ of the continuously molded body substantially averaged over the air gap height to obtain a value $$\bar{a} = \frac{10}{\delta\left[\frac{1}{\beta}\right]^{0.3}},$$

where β is the ratio of length to diameter of the extrusion duct and the value of the control parameter δ is at least 0.3. The unit of the averaged acceleration $\bar{a}$ is m/².

Thanks to the additional control of the acceleration the textile physical characteristics, such as loop strength or tendency towards fibrillation, are improved once again. Acceleration substantially averaged over the air gap height means an acceleration which is averaged over a substantial portion of the distance covered by the extruded, continuously molded body through the air gap.

The mechanical characteristics of the continuously molded body can be improved when the value of the control parameter δ in a further advantageous development is at least 0.6

Surprisingly enough, the textile characteristics of the continuously molded body can be improved once again when the control parameter δ in a further development of the method is at least 1.5.

The lowest tendency towards fibrillation and the greatest loop strength have been achieved in a development of the method in which the value of the control parameter δ is at least 2.2.

The mean acceleration $\bar{a}$ can easily be controlled by controlling the extrusion speed $v_E$ of the continuously molded body.

A conveying means which conveys the continuously molded body substantially without any tensile stress to a withdrawal mechanism may be arranged in an advantageous development of the method after the air gap or after a coagulation bath. The conveying speed of this conveying means can also be controlled in dependence upon the mean acceleration $\bar{a}$.

In a further advantageous development of the method of the invention the extruded, continuously molded body may be withdrawn by a withdrawal mechanism at a withdrawal speed $v_A$ after having passed through the air gap. The extruded, continuously molded body is supplied by the withdrawal mechanism to further processing means by applying a tensile stress.

When a withdrawal mechanism is used, the loop strength can be improved in a further advantageous development of the method according to the invention, and the tendency to fibrillate can be reduced if the extrusion speed $v_E$ of the continuously molded body at which the body exits from the extrusion duct orifice, and/or the withdrawal speed $v_A$ at which the continuously molded body is withdrawn by the withdrawal mechanism is controlled in response to acceleration $\bar{a}$.

This control operation can in particular be carried out according to the following formula:

$$v^2_A - v^2_E = \gamma \cdot H \cdot \bar{a}$$

where H is the air gap height and γ is a correction factor having a value between 7 and 7.4, preferably around 7.2. The units are for $v_A$ and $v_E$ m/min, for H mm, and for $\bar{a}$ m/s².

In a further development the method may additionally include the following step:

Stretching the extruded, continuously molded body after its exit from the extrusion duct orifice in the air gap by an air flow in the direction of extrusion around the extruded, continuously molded body, wherein the flow velocity of the air is greater than the extrusion speed of the continuously molded body.

In this step the polymer molecules of the continuously molded body are oriented by the stretching operation. The tensile force required for the stretching operation is gently applied by the air flow from the outer surface of the continuously molded body. At the same time the air flow is cooling the continuously molded body by carrying off heat.

When the continuously molded body in the air gap is stretched by air flowing substantially in parallel with the direction of extrusion of the continuously molded body and having a higher velocity than the extrusion speed, the acceleration $\bar{a}$ in the air gap can also be adjusted by controlling the velocity of the air.

Acceleration $\bar{a}$ can be controlled by controlling any combination of extrusion speed, withdrawal speed, conveying speed of the conveying means and flow velocity of the air.

The method according to the invention shall now be described in the following with reference to an embodiment taken in conjunction with the attached drawing, in which:

FIG. 1 shows an apparatus for carrying out the method according to the invention.

First of all the sequence of the method according to the invention shall be described with reference to FIG. 1.

In a reaction vessel 1 an extrusion solution 2 is prepared. The extrusion solution contains cellulose, water and a tertiary amine oxide, such as N-methylmorpholine-N-oxide (NMMO) and, optionally, stabilizers for the thermal stabilization of the cellulose and the solvent. Stabilizers may e.g. be: propyl gallate, media with an alkaline action or mixtures thereof. Further additives may optionally be contained, for instance titanium dioxide, barium sulfate, graphite, carboxymethyl cellulose, polyethylene glycols, chitin, chitosan, alginic acid, polysaccharides, dyes, antibacterially acting chemicals, flameproofing agents containing phosphorus, halogens or nitrogen, activated carbon, carbon blacks or electrically conductive carbon blacks, silicic acid as well as organic solvents as diluents, etc.

The extrusion solution 2 is conveyed via a pump 3 through a line or conduit system 4. The line system 4 has arranged therein a pressure compensating vessel 5 which compensates pressure and/or volume flow variations within the line system 4, so that an extrusion head 6 can be fed in a continuous and uniform manner with the extrusion solution 2.

The line system 4 is provided with temperature control means (not shown) by which the temperature of the extrusion solution 2 can be controlled in an accurate way. This is necessary because the chemical and mechanical characteristics of the extrusion solution are highly temperature-dependent. For instance, the viscosity of the extrusion solution 2 decreases with an increasing temperature and an increasing shear rate.

The line system 4 has further provided therein burst protection devices which are required because of the tendency of the extrusion solution to carry out a spontaneous exothermic reaction. The burst protection devices prevent damage to the line system 4 and the pressure compensating vessel 5 as well as damage in the downstream extrusion head 6.

A spontaneous exothermic reaction in the extrusion solution 2 takes place when a specific temperature is exceeded and upon aging of the extrusion solution 2, particularly in dead water zones. To prevent the last-mentioned situation, the line system 4 in the area through which the highly viscous extrusion solution 2 is flowing exhibits advantageous flow characteristics.

In the extrusion head 6 the extrusion solution is distributed in a nozzle chamber 7 over a multitude of extrusion ducts 8 in the form of spinning capillaries. The spinning capillaries 8 are arranged in series, in FIG. 1 in a direction perpendicular to the plane of drawing. A multitude of continuously molded bodies is thereby produced by an extrusion head 6 at the same time. There may also be provided a plurality of extrusion heads 6 so that several rows of spinning capillaries are present.

The spinning capillaries have an inner diameter D of less than 500 micrometer, preferably less than 250 micrometer. For special applications the diameter may also be less than 100 micrometer, preferably around 50 to 70 micrometer.

The length L of the spinning capillaries through which the extrusion solution is flowing is at least twice, but not more than 100 to 150 times the inner diameter D.

The spinning capillaries 8 are surrounded at least sectionwise by a heating means 9 by which the wall temperature of the spinning capillaries 8 can be controlled. The wall temperature of the spinning capillaries 8 is about 150° C. The temperature of the spinning solution is about 100° C. The spinning capillaries 8 may also be provided in any desired form in a support body which is temperature-controlled from the outside, resulting in high hole densities.

The heating means 9 preferably extends up to the exit opening 10 of the extrusion duct that is positioned in flow direction S. As a result, the wall of the extrusion duct 8 is heated up to the extrusion duct orifice 10.

As the extrusion duct is heated, a heated film flow of a low viscosity as compared to the core flow is formed on the inner wall of the extrusion duct because of the temperature-dependent viscosity of the extrusion solution. As a consequence, the velocity profile of the extrusion solution within the extrusion duct 8 and the extrusion process are changed in a positive way such that an improved loop strength and a reduced tendency towards fibrillation are achieved in comparison with the prior art.

In the extrusion duct 8 the extrusion solution is extruded and then exits in the form of a spun filament 11 into an air gap 12. The air gap 12 has a height H in the flow direction S of the extrusion solution.

Air 13 is passed at a high velocity along the continuously molded body 11 in a direction coaxial to the extrusion solution. The flow velocity of air 13 may be greater than the extrusion speed $v_E$ of the spun filament at which the continuously molded body exits from the extrusion duct orifice 10. As a result, a tensile stress by which the continuously molded body 11 is also stretched acts on the boundary surface between continuously molded body 11 and air 13.

After having passed through air gap 12 the continuously molded body enters into a coagulation bath zone 14 in which it is moistened or wetted with a coagulation solution. The wetting operation can be carried out either by means of a spraying or a wetting device (not shown). Alternatively, the continuously molded body 11 may also be immersed into a coagulation bath. The extrusion solution is stabilized by the coagulation solution.

After the coagulation bath zone 14 the continuously molded body 11 is withdrawn by a withdrawal mechanism 15 at a withdrawal speed $v_A$ and subjected to further processing steps, which are here not shown. Various other processing means may be provided between coagulation bath zone 14 and withdrawal mechanism 15. For instance, the continuously molded body 11 may be washed and pressed.

The extrusion solution has been heated for the extrusion process to a temperature at which it is viscous and can thus be extruded in a dimensionally stable form through the extrusion duct 8 and the extrusion duct orifice 10. After extrusion, in the air gap 12, the continuously molded body must be cooled. To this end a heat flow which is directed from the continuously molded body 11 into the air gap 12 must be built up.

The mechanical characteristics of the continuously molded body 11 decisively depend on the process steps directly before or after extrusion.

For instance, the loop strength of the continuously molded body can be improved and the tendency to fibrillate can be reduced if the heat flow density Q in the air gap is controlled to have a value $$Q = \frac{0.004}{\alpha \cdot \left[\frac{1}{\beta}\right]^{0.3}}$$

where β is the ratio of length L to diameter D of the extrusion duct 8 and the value of the control parameter α is at least 0.1.

The characteristic value β=L/D may assume values between 2 and 150, preferably in the range from 50 to 100.

In the above formula α represents a control parameter whose value is at least 0.1. In a further variant the value of the control parameter α may at least be 0.2. Preferably, the control parameter α is at least 0.5, particularly preferred is a value of at least 1.

The heat flow density Q is here a value of the heat flow in W/mm³ per volume unit of the air gap space, which value has been averaged over height H of the air gap 12. The heat flow density is the amount of heat charged by the spinning solution into the air gap space that directly surrounds the filament. The air gap space is assigned to an extrusion duct orifice 10 and is formed by a balance volume V which surrounds the continuously molded body 11 in the air gap 12. In the air gap space V the heat flow introduced by the continuously molded body 11 is balanced with the heat exiting from the air gap space. This thermal balance must take into account as negative heat flows the continuously molded bodies exiting from the balance volume and the heat carried away by the stationary or moved air 13 that surrounds the continuously molded body 11 in the air gap 12, as well as the radiated heat.

In extrusion or spinning heads 6 having a multitude of neighboring extrusion ducts 8 the balance volumes of the individual extrusion ducts 8 are contiguous, so that the heat flows of the individual, continuously molded bodies 11 have a mutual effect on one another. The mutual effect of the closely neighboring, continuously molded bodies is taken into account in the process control according to the invention.

The heat flow density Q is substantially defined by the air temperature and by the temperature of the continuously molded body and the amount of heat supplied by the continuously molded body. In the embodiment the temperature difference $\Delta T = T_E - T_L$ between temperature $T_E$ of the extrusion solution and temperature $T_L$ of the air is set to a value $$\Delta T = \frac{H}{d} \cdot \frac{0.004}{\dot{m} \cdot c_E \cdot \alpha \cdot \left[\frac{1}{\beta}\right]^{0.3}}$$

where $\dot{m}$ is the throughput of the extrusion solution through the extrusion duct orifice in g/s, $c_E$ is the specific thermal capacity of the extrusion solution in J/gk, d the hole density of the extrusion duct orifices per unit of area in hole/mm², and H the length of air gap 12 in mm.

Either temperature $T_E$ of the continuously molded body 11 or temperature $T_L$ of air 13 may be controlled or also both temperatures at the same time.

Moreover, all of the other factors listed in the equation may be used for controlling the spinning process.

In addition to the heat flow density, or also instead of the heat flow density, the average acceleration $\bar{a}$ of the continuously molded body 11 in m/s² in the air gap 12 may be adjusted such that it has the following value:

$$\bar{a} = \frac{10}{\delta \left[\frac{1}{\beta}\right]^{0.3}}$$

where $\beta$ is the ratio of the length to the diameter (L/D) of the extrusion duct 8. Quantity $\delta$ is a control parameter having a value of at least 0.3. In a further variant the value of the control parameter $\delta$ may be at least 0.6. Preferably, the control parameter $\delta$ is at least 1.5, particularly preferably at least 2.2.

The mean acceleration of the continuously molded body 11 in air gap 12 is the acceleration averaged over a substantial part of the air gap height H.

Acceleration $\bar{a}$ can be adjusted by changing the flow velocity of air 13, by changing the extrusion speed $V_E$ of the extrusion solution 2 on the extrusion duct orifice 10 or by changing the withdrawal speed $V_A$ of the withdrawal mechanism 15. The settings of these velocities and speeds may be combined in any desired way.

A sensor 16 may be provided for sensing the flow velocity of air 13. Likewise, a sensor 17 may be provided for sensing the extrusion speed $v_E$ and a sensor 18 for sensing the withdrawal speed $v_A$. The sensors 16, 17, 18 supply signals which are each representative of the speeds measured by them. These signals are supplied in electrical form to a control means 19 which processes these signals and outputs a control signal 20. Said control signal 20 can be transmitted to pump 3 to adjust the extrusion speed $V_E$ of the spinning material supplied to the extrusion head 6. The sensor 17 may also be used in combination with a precision spinning pump (not shown) which is integrated into the extrusion head 6. The control signal 20, however, may also be supplied to a motor 21 for driving the withdrawal mechanism 15 so as to adjust the withdrawal speed $V_A$. Finally, the control signal 20 may also be supplied to a means (not shown) for the supply of air 13 so as to adjust the velocity of air 13. It is thereby possible to build up a control loop for the feedback control of acceleration $\bar{a}$.

The extrusion speed $v_E$ can be controlled independently of or together with the withdrawal speed $v_A$. In the embodiment of FIG. 1 changes are possible between a control of the extrusion speed $v_E$ alone, of the withdrawal speed $v_A$ alone and a combined control of both speeds, so that the following formula is satisfied:

$$v_A^2 - v_E^2 = \gamma \cdot H \cdot \bar{a}$$

where H is the air gap height and $\gamma$ a correction factor having a value between 7 and 7.4. In particular, the value of the correction factor may be around 7.2.

In the embodiment a further conveying means 25 is shown between air gap 12 or coagulation bath zone 14 and the withdrawal mechanism 15. This optional conveying means 25 conveys the continuously molded body 11 substantially without any tensile stress to the withdrawal mechanism 15.

To this end a conveying means may be used in the form of a shaking or vibrating conveyor 25 in the case of which the continuously molded body 11 is gently conveyed by reciprocating movements B of a support and transportation surface 26.

The conveying speed of the conveying means 25 is much smaller than the extrusion speed $v_E$ or the withdrawal speed $v_A$, which are about the same. Consequently, the conveying means 25 acts as a buffer on which the continuously molded body 11 is stacked in a geometrical arrangement 27 before it is withdrawn by the withdrawal mechanism 15. The conveying speed of the conveying means 25 can also be controlled via corresponding sensors (not shown) in response to the mean acceleration $\bar{a}$ in the air gap.

Since the continuously molded body 11 is conveyed without any tensile stress in this area in which it is stabilized after extrusion, the loop strength is once again enhanced and the tendency to fibrillate is reduced considerably.

The invention claimed is:

1. A method for extruding a continuously molded body from an extrusion solution, comprising:
    passing the extrusion solution through an extrusion duct of a predetermined length and a predetermined diameter to an extrusion duct orifice;
    extruding the extrusion solution through the extrusion duct orifice to obtain an extruded, continuously molded body;
    passing the continuously molded body through an air gap of a predetermined air gap height;
    accelerating the continuously molded body in the air gap; wherein:
    the heat flow density Q substantially averaged over the air gap height is controlled to obtain a value $$Q = \frac{0.004}{\alpha \cdot \left[\frac{1}{\beta}\right]^{0.3}}$$

wherein β is the ratio of length to diameter of the extrusion duct and the value of the control parameter α is at least 0.1.

2. The method according to claim 1, wherein the value of the control parameter α is at least 0.2.

3. The method according to claim 2, wherein the value of the control parameter α is at least 0.5.

4. The method according to claim 3, wherein the value of the control parameter α is at least 1.0.

5. The method according to claim 1, wherein the temperature $T_E$ of the extrusion solution is controlled in response to the heat flow density Q.

6. The method according to claim 1, wherein: the temperature $T_L$ of the air surrounding the continuously molded body in the air gap is controlled in response to the heat flow density Q.

7. The method according to claim 5, wherein: a temperature difference $\Delta T = T_E - T_L$ between temperature $T_E$ of the extrusion solution and temperature $T_L$ of the air surrounding the continuously molded body in the air gaps controlled to obtain a value:

$$\Delta T = \frac{H}{d} \cdot \frac{0.004}{\dot{m} \cdot c_E \cdot \alpha \cdot \left[\frac{1}{\beta}\right]^{0.3}}$$

wherein m is the throughput of the extrusion solution through the extrusion duct orifice in g/s, $C_E$ is the specific thermal capacity of the extrusion solution, in J/g K, d the hole density of the bores provided in the die plate, in hole/mm², and H in mm the length of the air gap.

8. The method according to claim 7, wherein value β is at least 2.

9. The method according to claim 8, wherein value β is not more than 150.

10. The method according to claim 9, wherein value β is not more than 100.

11. The method according to claim 5, wherein temperature $T_L$ is controlled at a temperature $T_E$ which is kept substantially constant.

12. The method according to claim 5, wherein temperature $T_E$ is controlled at a temperature $T_L$ which is kept substantially constant.

13. The method according to claim 1, wherein the specific thermal capacity $C_E$ of the extrusion solution is at least 2.1 J/(g K).

14. The method according to claim 1, wherein the specific thermal capacity $C_E$ of the extrusion solution is not more than 2.9 J/(gK).

15. The method according to claim 1, wherein: the acceleration of the continuously molded body which has been averaged substantially over the air gap height is controlled to obtain a value $$\bar{a} = \frac{10}{\delta \left[\frac{1}{\beta}\right]^{0.3}},$$

wherein β is the ratio of length to diameter of the extrusion duct and the value of the control parameter δ is at least 0.6.

16. The method according to claim 15, wherein the value of the control parameter δ is at least 1.5.

17. The method according to claim 15, wherein the value of the control parameter δ is at least 2.2.

18. The method according to claim 1, wherein:
the acceleration of the continuously molded body which has been averaged substantially over the air gap height is controlled to obtain a value $$\bar{a} = \frac{10}{\delta \left[\frac{1}{\beta}\right]^{0.3}},$$

wherein β is the ratio of length to diameter of the extrusion duct and the value of the control parameter δ is at least 0.3, and the extrusion velocity $v_E$ of the continuously molded body through the extrusion duct openings controlled in response to acceleration $\bar{a}$.

19. The method according to claim 1, wherein:
the acceleration of the continuously molded body which has been averaged substantially over the air gap height is controlled to obtain a value $$\bar{a} = \frac{10}{\delta \left[\frac{1}{\beta}\right]^{0.3}},$$

wherein β is the ratio of length to diameter of the extrusion duct and the value of the control parameter δ is at least 0.3, and the extruded, continuously molded body is conveyed substantially without any tensile stress on a conveying means arranged after the air gap or a coagulation bath zone, to a withdrawal mechanism.

20. The method according to claim 19, wherein:
the conveying speed of the conveying means is controlled in response to the average acceleration $\bar{a}$.

21. The method according to claim 1, wherein:
the acceleration of the continuously molded body which has been averaged substantially over the air gap height is controlled to obtain a value $$\bar{a} = \frac{10}{\delta \left[\frac{1}{\beta}\right]^{0.3}},$$

wherein β is the ratio of length to diameter of the extrusion duct and the value of the control parameter δ is at least 0.3, and the extruded, continuously molded body after passage through the air gap is withdrawn by a withdrawal mechanism at a withdrawal speed $v_A$.

22. The method according to claim 21, wherein:
the withdrawal speed $v_A$ of the continuously molded body is controlled by the withdrawal mechanism in response to acceleration $\bar{a}$.

23. The method according to claim 15, wherein:
the acceleration of the continuously molded body which has been averaged substantially over the air gap height is controlled to obtain a value $$\bar{a} = \frac{10}{\delta\left[\frac{1}{\beta}\right]^{0.3}},$$

wherein $\beta$ is the ratio of length to diameter of the extrusion duct and the value of the control parameter $\delta$ is at least 0.3, and
the extrusion speed $v_E$ of the continuously molded body through the extrusion duct orifice and/or the withdrawal speed $v_A$ of the continuously molded body is controlled by the withdrawal mechanism according to the following formula:

$$v^2_A - v^2_E = \gamma \cdot H \cdot \bar{a},$$

wherein H is the air gap height and $\gamma$ a correction factor having a value between 7 and 7.4.

24. The method according to claim 23, wherein the value of the correction factor $\gamma$ is about 7.2.

25. The method according to claim 1, wherein:
the acceleration of the continuously molded body which has been averaged substantially over the air gap height is controlled to obtain a value $$\bar{a} = \frac{10}{\delta\left[\frac{1}{\beta}\right]^{0.3}},$$

wherein $\beta$ is the ratio of length to diameter of the extrusion duct and the value of the control parameter $\delta$ is at least 0.3, and
the extruded, continuously molded body after its exit from the extrusion duct orifice in the air gap is stretched by an air flow in the extrusion direction around the extruded, continuously molded body, wherein the flow velocity of air is greater than the extrusion speed of the continuously molded body.

26. The method according to claim 25, wherein:
the velocity of air (13) is controlled in response to $\bar{a}$ and/or the mean heat flow density Q in the air gap.

27. The method according to claim 1, wherein the extrusion solution comprises cellulose, water and a tertiary amine oxide.

\* \* \* \* \*